United States Patent
Zielinski et al.

(10) Patent No.: US 11,802,353 B2
(45) Date of Patent: Oct. 31, 2023

(54) TIRE TEXTILE CORD

(71) Applicant: The Goodyear Tire & Rubber Company, Akron, OH (US)

(72) Inventors: Bartosz Zielinski, Steinsel (LU); Raphael Beck, Eichlange (LU); Dirk Lothar Maria van Eck, Rodgau (DE); Björn Springer, Bruchköbel (DE); John Woods, Hanau Klein-Auheim (DE)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 343 days.

(21) Appl. No.: 16/951,041

(22) Filed: Nov. 18, 2020

(65) Prior Publication Data

US 2021/0155043 A1    May 27, 2021

Related U.S. Application Data

(60) Provisional application No. 62/938,507, filed on Nov. 21, 2019.

(51) Int. Cl.
*D02G 3/48* (2006.01)
*B60C 9/00* (2006.01)
(Continued)

(52) U.S. Cl.
CPC ............. *D02G 3/48* (2013.01); *B60C 9/005* (2013.01); *B60C 9/0042* (2013.01); *B60C 9/04* (2013.01);
(Continued)

(58) Field of Classification Search
CPC ........ B60C 9/0042; B60C 9/005; D02G 3/28; D02G 3/48; D07B 1/025
See application file for complete search history.

(56) References Cited

U.S. PATENT DOCUMENTS

| | | | |
|---|---|---|---|
| 3,563,848 A | | 2/1971 | Bhakuni et al. |
| 3,645,819 A | * | 2/1972 | Fujii ................. D02G 3/402 |
| | | | 152/543 |

(Continued)

FOREIGN PATENT DOCUMENTS

| | | |
|---|---|---|
| EP | 2261403 A1 | 12/2010 |
| EP | 3348681 A1 | 7/2018 |

(Continued)

OTHER PUBLICATIONS

Notice of Allowance dated Jun. 30, 2022 for Korean Patent Application No. 10-2020-0152716.

(Continued)

*Primary Examiner* — Shaun R Hurley
(74) *Attorney, Agent, or Firm* — Alvin T. Rockhill

(57) ABSTRACT

The present invention relates to a textile cord comprising at least two yarns, each yarn comprising multiple filaments, wherein each filament comprises polyethylene furanoate reinforced by carbon nano material and/or boron nitride nano material. These textile cords are particularly useful as tire reinforcements. Moreover, the present invention is directed to a polymeric composition comprising (1) polyethylene-2,5-furan dicarboxylate and (2) a carbon nano material or a boron nitride nano material. This polymeric composition can optionally be further comprised of one or more additional polyesters, such as polyethylene terephthalate or polyethylene naphthalate. This invention is further directed to a rubber component comprising said cords coated with rubber and to tires and other rubber products comprising such cords.

17 Claims, 3 Drawing Sheets

(51) Int. Cl.
*D07B 1/02* (2006.01)
*B60C 9/04* (2006.01)
*B60C 9/18* (2006.01)
*D02G 3/28* (2006.01)

(52) U.S. Cl.
CPC ............. *B60C 9/1807* (2013.01); *D02G 3/28* (2013.01); *D07B 1/025* (2013.01); *B60C 2009/0425* (2013.01); *B60C 2009/0458* (2013.01); *B60C 2009/0475* (2013.01); *D10B 2321/021* (2013.01); *D10B 2505/022* (2013.01)

(56) References Cited

U.S. PATENT DOCUMENTS

| | | | |
|---|---|---|---|
| 5,283,119 A | | 2/1994 | Shuttleworth et al. |
| 5,323,829 A | | 6/1994 | Hubbell et al. |
| 7,718,220 B2 | * | 5/2010 | D'Silva ................ D04H 1/4209 |
| | | | 427/180 |
| 2011/0017378 A1 | * | 1/2011 | Shimada ................... D01F 1/10 |
| | | | 428/297.4 |
| 2011/0174519 A1 | * | 7/2011 | Shah ...................... H01B 3/004 |
| | | | 264/108 |
| 2011/0186775 A1 | * | 8/2011 | Shah ......................... D01F 9/12 |
| | | | 524/576 |
| 2011/0241269 A1 | | 10/2011 | Siffer et al. |
| 2014/0010749 A1 | * | 1/2014 | Nakamura ............. D01G 13/00 |
| | | | 423/447.1 |
| 2015/0174961 A1 | | 6/2015 | Kramer et al. |
| 2015/0318080 A1 | * | 11/2015 | Mekala .................. D07B 1/147 |
| | | | 174/128.1 |
| 2017/0145153 A1 | * | 5/2017 | Jacquel .................. C08G 63/78 |
| 2017/0327976 A1 | * | 11/2017 | Cornille .................... D02G 3/48 |

FOREIGN PATENT DOCUMENTS

| | | |
|---|---|---|
| JP | 2014189212 A | 10/2014 |
| JP | 2016522334 A | 7/2016 |
| JP | 2017053058 A | 3/2017 |
| KR | 20170071783 A | 6/2017 |
| WO | 2010107769 A2 | 9/2010 |

OTHER PUBLICATIONS

Extended European Search Report dated Mar. 29, 2021 for European Patent Application No. 20208192.3 which is the European counterpart to the subject patent application.

* cited by examiner

TIRE TEXTILE CORD

This application claims benefit of U.S. Provisional Patent Application Ser. No. 62/938,507, filed on Nov. 21, 2019. The teachings of U.S. Provisional Patent Application Ser. No. 62/938,507 are incorporated herein by reference in their entirety.

FIELD OF THE INVENTION

This invention relates to a tire textile cord comprising yarns made of filaments, wherein the filaments comprise polyethylene furanoate reinforced by one or more of carbon nano materials and/or boron nitride nano materials. Moreover, the present invention is drawn to a tire rubber component and a tire comprising such cords or rubber components. In addition, the present invention is also directed to a polymeric composition comprising (1) polyethylene-2,5-furan dicarboxylate and (2) a carbon nano material or a boron nitride nano material.

BACKGROUND OF THE INVENTION

Tire performance has significantly improved over the recent decades. One driver of improvements in tire performance is a continuous development of cord constructions, in particular in the high-performance tire segment. Apart from the demand for advanced cord materials, there is also an increasing demand for improved sustainability in the tire industry requiring sustainable high-performance materials, including advanced sustainable tire cords.

SUMMARY OF THE INVENTION

A first object of the present invention may be to provide advanced tire textile cords or a polymeric material for such cords.

Another object of the present invention may be to provide sustainable tire textile cords.

Yet another object of the present invention may be to provide a sustainable tire textile cord with useful mechanical properties.

Thus, in a first aspect of the invention a tire textile cord is provided, the tire textile cord comprising at least two yarns, each yarn having multiple filaments, wherein each filament comprises at least one polymer or a polymeric composition including (or optionally consisting of) polyethylene furanoate reinforced by a carbon nano material and/or a boron nitride nano material.

Polyethylene furanoate (PEF) is a (fully) recyclable polymer which consists of 2,5-furandicarboxylic acid and monoethylene glycol repeat units. The monoethylene glycol repeat units can be typically derived from ethylene glycol. Polyethylene-2,5-furan dicarboxylate which is useful in the practice of this invention will typically have an intrinsic viscosity of at least 0.4 dl/g and will more typically have an intrinsic viscosity of at least 0.45 dl/g as determined in dichloroacetic acid at a temperature of 25° C. In some cases the polyethylene-2,5-furan dicarboxylate will have an intrinsic viscosity of at least 0.5 dl/g as determined in dichloroacetic acid at a temperature of 25° C. The polyethylene-2,5-furan dicarboxylate could be synthesized by the condensation polymerization of 2,5-furandicarboxylic acid and ethylene glycol in the molten state.

It is typically advantageous to further increase the molecular weight of the polyethylene-2,5-furan dicarboxylate via solid state polymerization. This is accomplished by solidifying the polymer made in the melt into pellets or chips which are then heated to an elevated temperature which is high enough to facilitate or allow further polymerization but which is below the melting point of the polyethylene-2,5-furan dicarboxylate. The solid state polymerization step can be conducted under a vacuum or in the flow of an inert gas which is sufficient to remove the water that is generated as a by-product of the polymerization reaction. To keep the pellets or chips of the polymer from sticking together during solid state polymerization it is normally desirable to crystallize the polymer make by melt polymerization before solid state polymerization.

The polyethylene-2,5-furan dicarboxylate utilized in the practice of this invention is preferably a fully bio-based material. PEF, as such, is known in the art. In filaments it has superior tensile properties, in particular good tensile strength which can be for instance 3 to 4 times higher than in polyethylene terephthalate (PET). PEF has also an improved heat resistance over PET in view of its higher melting temperature. In addition, it has been found that the tensile strength of the cord can be further improved by the additional reinforcement of nano material, in particular consisting of carbon or boron nitride. Other effects resulting from the addition of said nano material, or in other words of such nano fillers or nano filler material, may involve an improved barrier performance to oxygen, $CO_2$ and water, a higher electrical conductivity (in particular in case of carbon nanomaterial), improved dielectric properties (in particular in case of boron nitride), higher thermal conductivity and an increased Young's modulus.

In one embodiment of the present invention, the nano material may be composed of or provided as one or more of nano particles (in particular primary nano particles), nano sheets, nano fibers, and nano tubes. As known in the art so called primary (nano) particles can also form aggregates and agglomerates.

In another embodiment said nano material may have a BET surface area by nitrogen adsorption at 77K of at least 100 $m^2/g$ to about 2,700 $m^2/g$.

In another embodiment, the aspect ratio of the nano material (e.g. particles, sheets, fibers or tubes) may range from 100:1 to 100000 1, preferably to 10000:1 (ratio between the longest or maximum dimension, or in other words diameter, to the shortest dimension or diameter).

In another embodiment, in at least one dimension the nano material has a maximum thickness (or in other words size) of less than 100 nm but at least a thickness of 1 nm, 5 nm or even 10 nm. It is emphasized that this shall not exclude that the material can have larger lengths measured in another direction or dimension. Amongst others such relatively small maximum thickness may help to keep the nano material small relatively to the diameter of a filament comprising the PEF or consisting of PEF.

In still another embodiment, the filaments have a diameter of ranging from 3 μm to 50 μm, preferably to 30 μm.

In still another embodiment, one or more yarns may have a diameter ranging from 100 μm to 500 μm.

In yet another embodiment, the cord may have a diameter ranging from 0.3 mm to 2 mm, preferably from 0.5 mm to 1.2 mm, or about 0.8 mm.

In still another embodiment, the linear density of the yarn ranges from 200 dtex to 5000 dtex, preferably from 800 dtex to 3500 dtex.

In yet another embodiment, the twist of each yarn as such ranges from 100 to 600 turns per meter.

In still another embodiment, each filament, or in other words, the polymer or polymeric composition of each filament comprises between 0.001 weight percent (or preferably 0.5 weight percent) and 5 weight percent (or preferably 4 weight percent) of nano material, based on the total weight of nano material and polymer (preferably polyethylene furanoate and PET). This may apply in particular in combination with the size ranges mentioned herein.

In still another embodiment, the nano material is provided as nano sheets having a thickness ranging from 0.5 nm (or 1 nm) to 10 nm (or 5 nm) and a maximum lateral extension (width or length) ranging from 100 nm to 15 μm. In particular, carbon based nanomaterial and boron nitride are available in such sheets. In the case of carbon based nanomaterial, the sheets may also be described as graphene sheets and boron nitride may have also a honeycomb structure as known as such to the person skilled in the art. Such sheets (also sometimes called 2D platelets or flakes) are of particular interest because of their large surface area (which helps to decrease the specific gravity and allows lower quantities of nano material required to achieve higher performance) and their relatively high aspect ratio (which is good for a polymer barrier enhancement property, for instance). Thus, such nanosheets can also significantly reduce the amount of nano filler needed. Moreover, boron nitride atoms alternating on vertical axis can lead to stronger intra-planar bonds in comparison to graphene sheets.

In another embodiment, the polyethylene furanoate is at least partially produced from one or more of biomass and renewable raw materials. It is known in the art that PEF can be produced from biomass and/or renewable raw materials. This may be of particular interest from an ecological perspective and/or also in view of potential regulatory requirements.

In another embodiment, one or more of the filaments further comprise PET so as to form one or more hybrid filaments comprising reinforced polyethylene furanoate and one or more additional polyesters, such as polyethylene terephthalate (PET) or polyethylene naphthalate (PEN). It is emphasized that this is not to be confused with a hybrid cord in which multiple filaments or yarns consisting each of only one material are combined. In this embodiment one filament comprises at least two materials, i.e. PEF (reinforced with the nano material) and PET and/or PEN. This could for example make the cord more cost efficient in view of relatively high costs for the PEF material. Moreover, different material properties of PEF and PET and/or PEN material could be combined. Also, the different adhesion properties of PEF (in particular when comprising nano material) and PET to rubber matrix materials in rubber components could be improved by the provision of the suggested hybrid textile cord. Such hybrid polymeric compositions are typically made by melt blending the PEF with the other polyester(s).

In a further embodiment, the PET is at least partially made from one or more of renewable raw materials and recycled material. As known to the person skilled in the art, there is the possibility to obtain PET comprised partially or completely of recycled or bio-based material. Thus, a combination of recycled or bio-based PET material and for instance bio-based PEF may provide an even more sustainable and cost-effective solution.

In yet another embodiment, the cord has an elongation at break ranging from 5 percent (preferably 10 percent) to 25 percent (preferably 20 percent).

In still another embodiment, one or more filaments comprise polyethylene furanoate (which is reinforced by the nano material) and PET, wherein a first material of reinforced polyethylene furanoate and PET is arranged in an essentially outer hollow cylindrical shell and a second material of the reinforced polyethylene furanoate and the PET is arranged in a cylindrical core of the filament surrounded by said shell of the filament. Such an embodiment may for example be of particular interest with regards to adhesion of the cord to the rubber matrix of a rubber component in a tire. Thus, said outer shell could e.g. consist of PET, while the cylindrical core could consist of the PEF comprising said nano material. In another example, PET and reinforced PEF may be alternatingly arranged in circular sectors of the filaments (viewed in a cross section essentially perpendicular to the length of the filament).

In still another embodiment, each of the filaments consists of polyethylene furanoate reinforced by one or more of carbon nano material and boron nitride nano material.

In yet another embodiment, each of the filaments consists of PET and polyethylene furanoate reinforced by one or more of carbon nano material and boron nitride nano material.

In another embodiment, the nano material is functionalized with one or more of hydroxyl groups, ammonium groups, amine groups, sulphates, sulphonetes, epoxy groups, carboxylate and carboxylic acid groups, esters and anhydrides. Such groups could, preferably be attached to the surface of the nanofiller sheets by covalent bonds, using hydrogen bonding, ionically, physical adsorption or electrostatically. Such functionalization shall also include addition of hydrocarbons comprising such groups to the nano material. Such functionalization may for example improve the interfacial interactions between the nano material and the polymer matrix.

In yet another embodiment, each yarn comprises between 50 and 1000 of the filaments.

In another aspect of the present invention, a tire (rubber) component selected from a belt ply, an overlay ply, a carcass ply, and a ply strip (this shall also include overlay strips), is provided wherein the tire component comprises a tire textile cord in accordance with the first aspect of the invention and optionally one of its embodiments. Such rubber components may comprise cords which are coated with rubber. In particular, the rubber component may comprise textile fabrics comprising the textile cords. Such fabrics may comprise a plurality of cords arranged and spaced apart from one another in a parallel manner. Said cords may be connected with one another in a direction essentially perpendicular to the length of the cords by a so-called weft. The cords may be considered as a warp. In another example the cords could form the warp and the weft. However, in addition or alternatively, a plurality of cords could be arranged in parallel and spaced apart from one another in a rubber component without any weft.

In an embodiment, the thickness of a rubber component could range from 0.5 mm to 10 mm, or preferably from 1 mm to 6 mm.

In another embodiment, the density of cords in the rubber component (measured in parallel to the ply and perpendicular to the extension of the cords) is preferably between 14 ends per inch (EPI) and 38 EPI.

In a third aspect of the invention a tire is provided, wherein the tire may comprise at least one cord or at least one rubber component in accordance with the aforementioned aspects of the present invention and/or one of their embodiments.

In a further aspect of the invention, a method of making a tire textile cord, tire component or a tire may be provided. Such a method can comprise one or more of the following steps:

(preferably in-situ) polymerizing of PEF out of monomers;

dispersing carbon or boron nitride nano material in one of said monomers;

mixing and/or polymerizing the monomers;

obtaining (solid) chips comprising PEF reinforced by said nano material;

melting the PEF reinforced by said nano material (e.g. said chips);

extruding the PEF reinforced by said nano material through a sieve and/or extrusion dies/spinnerets to obtain PEF filaments reinforced by said nano material;

spinning the extruded filaments to a yarn;

twisting at least two yarns to the cord;

providing a plurality of cords parallelly arranged in a plane and coating the plurality of cords from both sides of the plane with rubber material to obtain a tire component such as a ply or ply strip.

including the ply or ply strip, or the cords in a tire curing the ply, ply strip and/or the tire.

In a preferred embodiment, the PEF reinforced by said nano material may be co-extruded with PET so as to form hybrid filaments consisting each of PEF reinforced with the nano material and PET. For instance, extrusion dies (or spinnerets) may be adapted and used to extrude the PEF reinforced by the nano material as a cylindrical core of the filaments and the PET as a hollow cylindrical shell of the filaments. Or, in another example, the extrusions dies may be adapted to extrude the PET and the PEF reinforced with the nano material in alternating circular sectors of the filaments.

The word rubber or rubber material shall be considered as exchangeable with elastomer or elastomeric material herein.

The features mentioned in the composition, cord, component or method may be further combined with elements of one or more of the other aspects of the invention or their embodiments mentioned herein.

BRIEF DESCRIPTION OF THE DRAWINGS

The structure, operation and advantages of the invention will become more apparent upon contemplation of the following description taken in conjunction with the accompanying drawings, wherein.

DETAILED DESCRIPTION OF THE INVENTION

Figure 1:
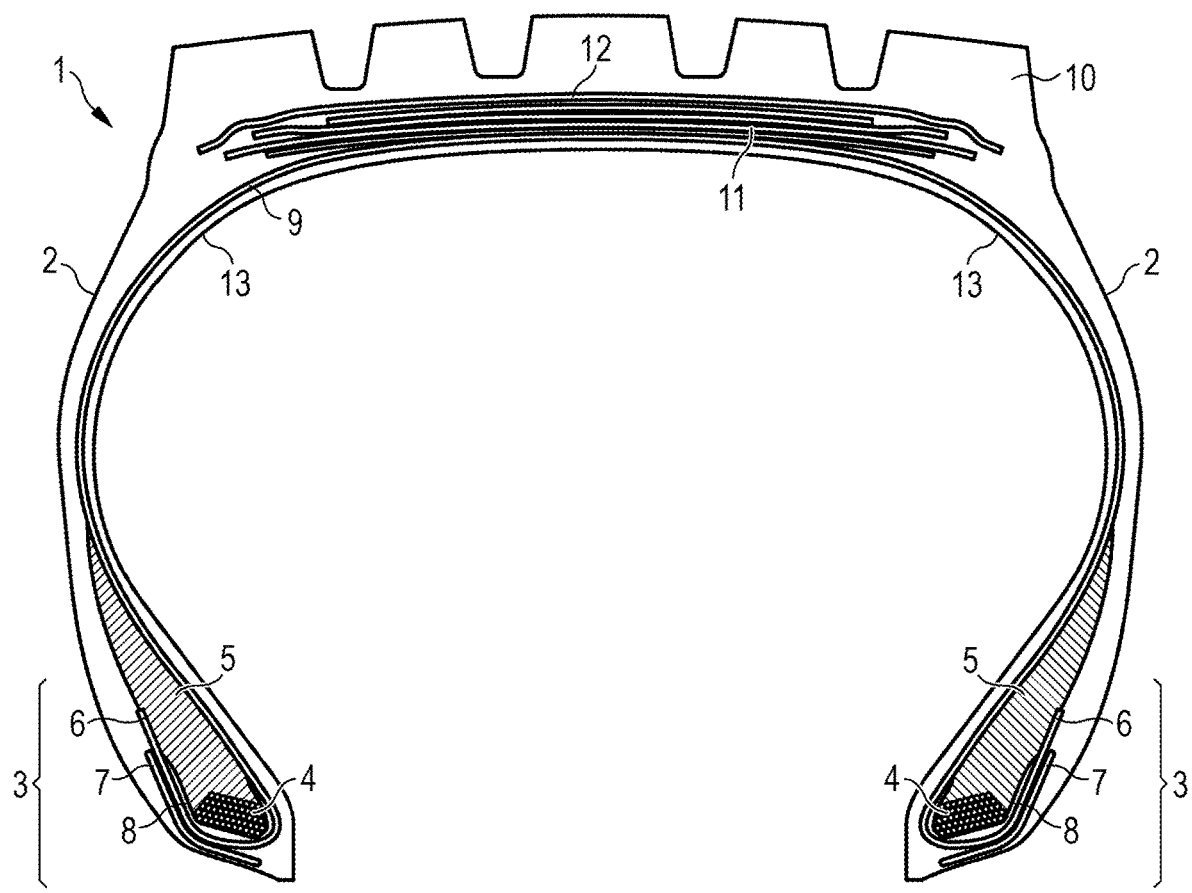
FIG. 1 shows a schematic cross section of a tire comprising a rubber component with a tire textile cord in accordance with an embodiment of the present invention.

FIG. 1 is a schematic cross-section of a tire 1, in accordance with a first non-limiting embodiment of the invention.

The example tire 1 has a tread 10, an inner liner 13, a belt structure comprising four belt plies 11, a carcass ply 9, two sidewalls 2, and two bead regions 3 comprising bead filler apexes 5 and beads 4. The tire 1 is suitable, for example, for mounting on a rim of a vehicle, e.g. a truck or a passenger car. As shown in FIG. 1, the belt plies 11 may be covered by an overlay ply 12. The carcass ply 9 includes a pair of axially opposite end portions 6, each of which is associated with a respective one of the beads 4. Each axial end portion 6 of the carcass ply 9 may be turned up and around the respective bead 4 to a position to anchor each axial end portion 6. The turned-up portions 6 of the carcass ply 9 may engage the axial outer surfaces of two flippers 8 and axial inner surfaces of two chippers 7. As shown in FIG. 1, the example tread 10 may have four circumferential grooves, each groove essentially defining a U-shaped opening in the tread 10. The main portion of the tread 10 may be formed of one or more tread compounds, which may be any suitable tread compound or compounds. The tire 1 has in this non-limiting example a carcass ply comprising textile cords in accordance with the invention. Further details about such cords are described in relation to FIGS. 2 to 4 hereinbelow.

While the embodiment of FIG. 1 suggests a plurality of tire components including for instance apexes 5, chippers 7, flippers 8 and overlay 12, such components are not mandatory for the invention. Also, the turned-up end of the carcass ply 9 is not necessary for the invention or may pass on the opposite side of the bead area 3 and end on the axially inner side of the bead 4 instead of the axially outer side of the bead 4. The tire could also have for instance more or less than four grooves.

Figure 2:
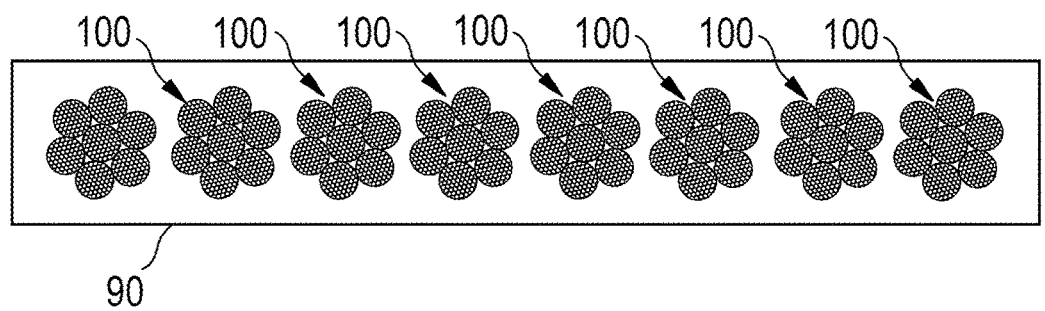
FIG. 2 shows a schematic cross section of a rubber component in the form of a ply strip comprising parallel textile cords in accordance with another embodiment of the present invention.

The schematic cross-section of FIG. 2 shows a rubber component in the form of a ply, e.g. a carcass, belt or overlay ply 90 which comprises a plurality of cords 100 in accordance with an embodiment of the present invention. Typically, such a ply 90 is made in a textile calendar in which a plurality of essentially parallel and spaced apart cords 100 are coated from both sides with a layer or sheet of rubber composition. Such calendaring methods are well known to the person skilled in the art of tire building. After curing, the cords 100 are embedded in the rubber composition reinforcing the same.

Figure 3:
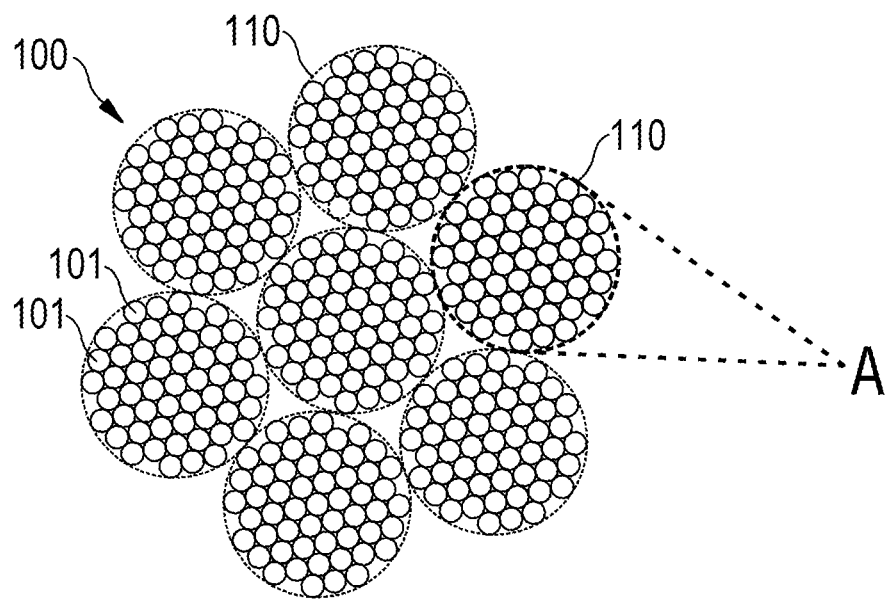
FIG. 3 shows a schematic cross section of a tire textile cord in accordance with one embodiment in accordance with the present invention.

As shown in relation to FIG. 3, the cord 100 may consist of a plurality of yarns 110, wherein each yarn consists of a plurality of filaments 101. In the present example, the cord 100 comprises, in the form of a non-limiting example, seven yarns 110 and each yarn has more than fifty filaments 101. Preferably, each yarn has between thirty and two hundred fifty filaments. The yarns 110 may be twisted together to form the cord 100. Alternatively, the cord 100 could have a central yarn 110 which extends in a straight manner with one or more further yarns 110 being wrapped around the central yarn 110.

Figure 4:
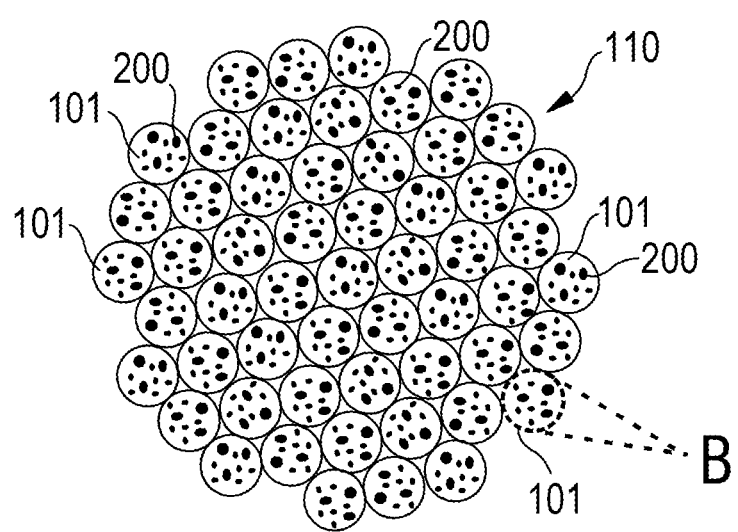
FIG. 4 shows a magnified schematic cross section of the yarn of Area A of FIG. 3.

FIG. 4 is a magnified view of the yarn 110 shown in Area A of FIG. 3. As shown in FIG. 4, each filament 101 of the yarn 110 comprises a plurality of nano particles and nano sheets 200 in the depicted embodiment (not shown with exact proportions in this schematic drawing). The nano material in the filaments 101 may be made of carbon and/or boron nitride which is embedded in a polymeric material consisting in this example of polyethylene furanoate (PEF). It is emphasized that the Figures of the present invention are intended to visualize the invention for the sake of better comprehensibility but are not intended to give exact proportions between nano material, filaments, yarns and cord.

Figure 5A:
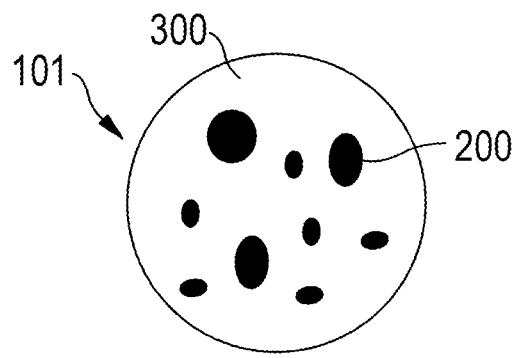
FIG. 5*a* shows a schematic cross section of a filament as shown in Area B of FIG. 4.

One of the filaments shown in FIG. 4, in particular corresponding to the Area B of FIG. 4, is shown schematically magnified in FIG. 5a. As visible in the cross sectional view of FIG. 5a, the nano material 200 is embedded in the polymer material, i.e. in the PEF material 300. While the situation shown in FIG. 5a may be a preferred embodiment for the composition of the filaments 101, other filaments within the scope of the invention are possible.

Figure 5B:
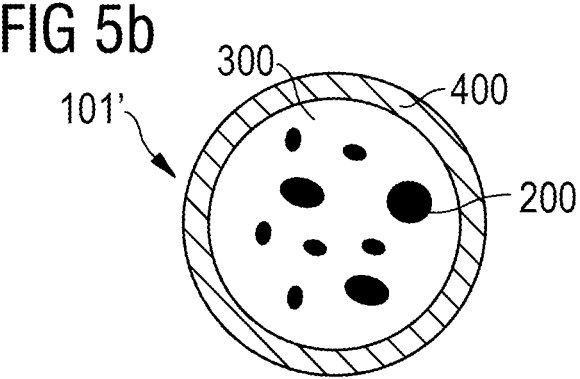
FIG. 5*b* shows an alternative composition of a filament in accordance with another example of the present invention.

For instance, FIG. 5b shows another embodiment of a filament 101' in which a cylindrical core of the filament 101' comprises a PEF material 300 comprising nano material 200 embedded, or in other words dispersed, therein. This core portion is (essentially concentrically) surrounded by a hollow cylindrical portion made of PET material 400. In general, the hollow cylindrical layer could have a thickness ranging from 1 percent, preferably 5 percent, to 25 percent of the total diameter of the filament 101'. One reason for providing such a filament 101' could be to improve the adhesion to the rubber matrix in a rubber component in which the cord is coated with rubber material. In particular, in case the nano material 200 and/or PEF impairs the adhesion to the rubber material in a rubber component or in other words to a rubber coating of the cord, the provision of a closed outer PET material 400 shell allows to keep the known adhesion properties of the PET material 400. This may also mean that if adhesive dips are used on the cord, known formulations of such dip may be kept with the cord 101'. Moreover, the cord 101' will still benefit from the combination of the advanced mechanical properties of the PEF material 300 and nano material 200.

Figure 5C:
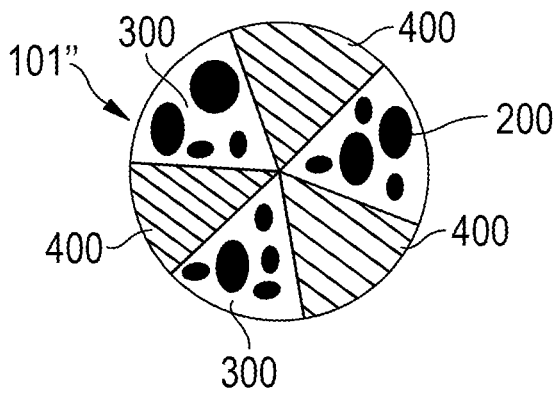
FIG. 5*c* shows a composition of a filament in accordance with still another example of the present invention.

Yet another embodiment of a filament 101" is shown in FIG. 5c. The cross section of the filament 101" exhibits multiple alternating circular sectors. A sector of PEF material 300 has two neighboring sectors of PET material 400. Each sector of PET material 400 has two neighboring sectors of PEF material 300 reinforced with nano material 200. Such a filament 101" may also help to combine the properties of PET material 400 and reinforced PEF material 300. In particular, the PET material 400 may help to improve adhesion or at least allow for a use of known adhesives/dips to connect the filaments 101" in a cord to a rubber coating, as e.g. in a rubber component similar to that of FIG. 2. At the same time the superior mechanical properties of the reinforced PEF material 300 may be leveraged in the embodiment of FIG. 5c.

While certain representative embodiments and details have been shown for the purpose of illustrating the subject invention, it will be apparent to those skilled in this art that various changes and modifications can be made therein without departing from the scope of the subject invention.

What is claimed is:

1. A textile cord comprising at least two yarns, each yarn having multiple filaments, wherein each of the filaments comprises at least one polymer comprising polyethylene furanoate reinforced by a carbon nano material and/or a boron nitride nano material, wherein each of the filaments comprises from 0.001 weight percent to 5 weight percent of the nano material, based on a total weight of the nano material and the polymer.

2. The textile cord of claim 1, wherein the nano material is provided as one or more of: nano particles, nano sheets, nano fibers, and nano tubes.

3. The textile cord of claim 2, wherein the nano particles, nano sheets, nano fibers or nano tubes have one or more of:
   A) a thickness ranging from 1 nm to 5 nm and a maximum lateral extension ranging from 100 nm to 15 µm, or
   B) an aspect ratio between thickness and length ranging from 100:1 to 100000:1.

4. The textile cord of claim 1, wherein the nano material has one or more of:
   A) in at least one dimension, a maximum thickness which is less than 100 nm; and
   B) a BET surface area by Nitrogen adsorption at 77K ranging from 100 m$^2$/g to about 2,700 m$^2$/g.

5. The textile cord of claim 1, wherein the filaments have a diameter ranging from 3 µm to 50 µm.

6. The textile cord of claim 1, wherein the polyethylene furanoate is at least partially produced from one or more of biomass and renewable raw materials.

7. The textile cord of claim 1, wherein the cord has an elongation at break ranging from 5 percent to 25 percent.

8. The textile cord of claim 1, wherein at least one filament comprises polyethylene furanoate reinforced by the nanomaterial and PET, and wherein
   A) a first material selected from reinforced polyethylene furanoate and PET is arranged in a cylindrical core portion of the filament and a second material selected from the reinforced polyethylene furanoate and the PET is arranged in a hollow cylindrical portion of the filament surrounding the cylindrical core portion; or
   B) reinforced polyethylene furanoate and PET are alternatingly arranged in circular sectors of the filament.

9. The textile cord of claim 1, wherein each of the filaments consists of the polyethylene furanoate reinforced by one or more of the carbon nano material and the boron nitride nano material.

10. The textile cord of claim 1, wherein the nano material is functionalized with one or more of hydroxyl groups, amine groups, ammonium groups, sulphates, sulphonetes, epoxy groups, carboxylate and carboxylic acid groups, esters and anhydrides.

11. The textile cord of claim 1, wherein each yarn has one or more of:
   A) between 50 and 1000 of the filaments;
   B) a linear density ranging from 200 to 5000 dtex;
   C) a twist ranging from 100 to 600 turns per meter.

12. A rubber component selected from a belt ply, an overlay ply, a carcass ply, and a ply strip, wherein the tire component comprises a tire textile cord in accordance with claim 1.

13. A tire comprising a tire rubber component according to claim 12.

14. The textile cord of claim 1, wherein each of the filaments comprises from 0.5 weight percent to 4 weight percent of the nano material, based on a total weight of the nano material and the polymer.

15. A textile cord comprising at least two yarns, each yarn having multiple filaments, wherein each of the filaments comprises at least one polymer comprising polyethylene furanoate reinforced by a carbon nano material and/or a boron nitride nano material, wherein at least one of the filaments further comprises PET so as to form a hybrid filament comprising reinforced polyethylene furanoate and PET.

16. The textile cord of claim 15, wherein the PET is at least partially made from one or more of renewable raw materials and recycled material.

17. A textile cord comprising at least two yarns, each yarn having multiple filaments, wherein each of the filaments comprises at least one polymer comprising polyethylene furanoate reinforced by a carbon nano material and/or a boron nitride nano material, wherein each of the filaments consists of PET and polyethylene furanoate reinforced by one or more of the carbon nano material and the boron nitride nano material.

* * * * *